US012384658B2

(12) United States Patent
Dold

(10) Patent No.: US 12,384,658 B2
(45) Date of Patent: Aug. 12, 2025

(54) METHOD FOR DETERMINING A WEAR STATE OF COMPONENTS OF A SUSPENSION MEANS ARRANGEMENT OF AN ELEVATOR SYSTEM

(71) Applicant: Inventio AG, Hergiswil (CH)

(72) Inventor: Florian Dold, Cham (CH)

(73) Assignee: INVENTIO AG, Hergiswil (CH)

( * ) Notice: Subject to any disclaimer, the term of this patent is extended or adjusted under 35 U.S.C. 154(b) by 311 days.

(21) Appl. No.: 17/756,365

(22) PCT Filed: Nov. 27, 2020

(86) PCT No.: PCT/EP2020/083617

§ 371 (c)(1),
(2) Date: May 24, 2022

(87) PCT Pub. No.: WO2021/105347

PCT Pub. Date: Jun. 3, 2021

(65) Prior Publication Data

US 2023/0002194 A1 Jan. 5, 2023

(30) Foreign Application Priority Data

Nov. 29, 2019 (EP) .................................... 19212626

(51) Int. Cl.
*B66B 7/12* (2006.01)
*B66B 11/00* (2006.01)

(52) U.S. Cl.
CPC ........... *B66B 7/1215* (2013.01); *B66B 11/008* (2013.01)

(58) Field of Classification Search
CPC ........ B66B 7/1215; B66B 11/008; B66B 7/06
See application file for complete search history.

(56) References Cited

U.S. PATENT DOCUMENTS 9,428,364 B2 * 8/2016 Aulanko ................ B66B 11/08
9,573,792 B2 * 2/2017 Aulanko ............... B66B 11/008
2005/0226584 A1 * 10/2005 Williams ................ D04C 1/02 385/130
2006/0163010 A1 * 7/2006 Ogava ..................... B66B 7/068 187/401

(Continued)

FOREIGN PATENT DOCUMENTS

CN 103204416 A 7/2013
CN 104612053 A 5/2015

(Continued)

*Primary Examiner* — Mohammad K Islam
(74) *Attorney, Agent, or Firm* — William J. Clemens; Shumaker, Loop & Kendrick, LLP

(57) ABSTRACT

A method and a monitoring device determine a wear state of components such as a cable-like suspension means, a traction sheave of a drive machine and deflection rollers of a suspension means arrangement of an elevator system. The method comprises at least the following steps: monitoring an actual time curve of a first parameter which correlates with the wear state of at least one first monitored component of the components; comparing the actual time curve of the monitored first parameter with a predetermined expected time curve of the first parameter; and determining the wear state of the monitored component based on a result of the comparison.

14 Claims, 1 Drawing Sheet

(56) References Cited

U.S. PATENT DOCUMENTS

| | | | | |
|---|---|---|---|---|
| 2006/0174604 | A1* | 8/2006 | Vanderbeken | B66B 7/06 57/217 |
| 2011/0073000 | A1 | 3/2011 | Thum | |
| 2013/0119256 | A1* | 5/2013 | Husmann | B66B 7/1238 250/341.1 |
| 2017/0008734 | A1 | 1/2017 | Roberts et al. | |
| 2017/0322118 | A1* | 11/2017 | Sperling | G01M 5/0025 |
| 2018/0174768 | A1* | 6/2018 | Remy | G01R 31/3274 |
| 2018/0305864 | A1* | 10/2018 | Baldinger | D07B 1/148 |
| 2019/0119071 | A1 | 4/2019 | Dudde | |
| 2020/0122982 | A1* | 4/2020 | Van Veluw | B66C 23/52 |
| 2024/0190179 | A1* | 6/2024 | Singh | B60C 11/246 |

FOREIGN PATENT DOCUMENTS

| | | | |
|---|---|---|---|
| CN | 104627762 | A | 5/2015 |
| CN | 106715310 | A | 5/2017 |
| CN | 108238527 | A | 7/2018 |
| CN | 109071188 | A | 12/2018 |
| CN | 109928285 | A | 6/2019 |
| CN | 109987480 | A | 7/2019 |
| EP | 0849208 | A1 | 6/1998 |
| EP | 2299251 | A1 | 3/2011 |
| EP | 2628698 | B1 | 4/2016 |
| EP | 3130555 | A1 | 2/2017 |
| JP | 2009061917 | A | 3/2009 |
| JP | 2011126710 | A | 6/2011 |
| JP | 2011132010 | A | 7/2011 |
| JP | 2013002425 | A | 1/2013 |
| JP | 2016060550 | A | 4/2016 |
| JP | 2019085242 | A | 6/2019 |
| RU | 2617145 | C1 | 4/2017 |
| WO | 2003035531 | A1 | 5/2003 |
| WO | 2007141371 | A2 | 12/2007 |
| WO | 2016040452 | A1 | 3/2016 |
| WO | 2018099864 | A1 | 6/2018 |
| WO | 2018139434 | A1 | 8/2018 |
| WO | 2019081412 | A1 | 5/2019 |

* cited by examiner

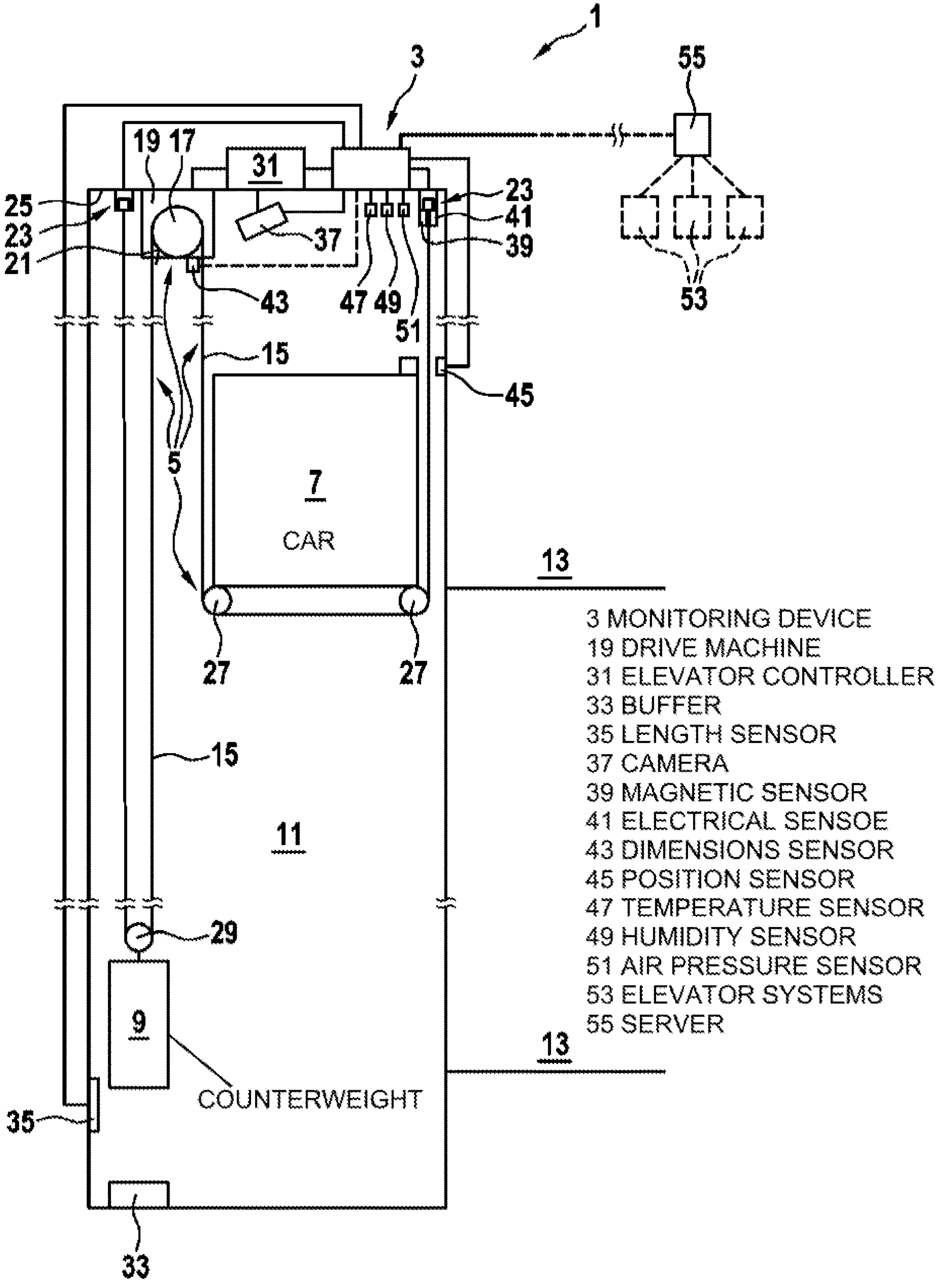
1
3
55
19 17
31
25
23
21
23
41
39
37
43
47 49
51
53
15
45
5
7
CAR
13
27
27
3 MONITORING DEVICE
19 DRIVE MACHINE
31 ELEVATOR CONTROLLER
33 BUFFER
35 LENGTH SENSOR
37 CAMERA
39 MAGNETIC SENSOR
41 ELECTRICAL SENSOE
43 DIMENSIONS SENSOR
45 POSITION SENSOR
47 TEMPERATURE SENSOR
49 HUMIDITY SENSOR
51 AIR PRESSURE SENSOR
53 ELEVATOR SYSTEMS
55 SERVER
15
11
29
9
13
COUNTERWEIGHT
35
33

METHOD FOR DETERMINING A WEAR STATE OF COMPONENTS OF A SUSPENSION MEANS ARRANGEMENT OF AN ELEVATOR SYSTEM

FIELD

The present invention relates to a method which can be used to determine a wear state of components of a suspension means arrangement in an elevator system. The invention also relates to a monitoring device for carrying out or controlling such a method, a computer program product for programming such a monitoring device, and a computer-readable medium with such a computer program product.

BACKGROUND

In an elevator system, a suspension means arrangement is used to move an elevator car and, if necessary, a counterweight within an elevator shaft and generally also to hold the weight thereof.

In general, the suspension means arrangement comprises a number of elongate, flexible suspension means such as cables, belts or straps. Cables can in this case consist of a large number of wires or strands, which are usually made of metal, in particular steel. Belts or straps can also have wires or strands, for example made of steel or fiber materials, as load-bearing elements, which wires or strands are incorporated in a matrix material such as a polymer or elastomer.

Depending on the type of suspension implemented in an elevator system, these suspension means can be anchored to the elevator car and/or the counterweight in order to hold them. Alternatively, the suspension means can be anchored in the elevator shaft, for example on a shaft ceiling, and can hold the elevator car and/or the counterweight via deflection rollers attached thereto, which are often also referred to as pulleys.

In this case, the suspension means are usually moved by a drive machine in order to be able to move the elevator car held thereby and the counterweight in opposite directions within the elevator shaft. In this case, the suspension means generally extend over a traction sheave which is rotationally driven by the drive machine. Depending on the type of suspension means used, the traction sheave can have a profiled surface. For example, the traction sheave for suspension means in the form of cables can be formed having grooves extending in the circumferential direction, into which the cables can engage in order to produce sufficient traction between the traction sheave and the cables. In the case of suspension means in the form of belts or straps, the suspension means can have a profiled surface, for example a V-shaped toothed surface, and the traction sheave can have a complementary profiled surface on the lateral surface thereof.

The components mentioned, i.e. in particular the suspension means, the drive machine with the traction sheave thereof, the deflection rollers and the anchorings of the suspension means, as well as other components, can together form the suspension means arrangement.

During the operation of an elevator system, wear generally occurs in the components of the suspension means arrangement.

For example, suspension means can gradually lose their mechanical strength due to friction with the traction sheave or the deflection rollers and/or frequent bending during deflection by the traction sheave or the deflection rollers. The wear can be the result of superficially abraded material and/or material fatigue and possibly material breaks. Wear on suspension means generally leads to a change in their physical properties. In particular, wear on the suspension means can lead to a reduced load-carrying capacity of these suspension means. In the worst case, suspension means can tear. In addition, wear on suspension means can influence the elasticity thereof. For example, suspension means can become more elastic or softer over time, such that it can become difficult, for example, to precisely position an elevator car held on the suspension means by means of the suspension means.

Signs of wear can also occur on the traction sheave and the deflection rollers. For example, a profiling of a lateral surface of these components can change structure over time, in particular due to abrasion. Wear-related changes to the traction sheave or the deflection rollers can lead, inter alia, to a frictional connection between these components and the suspension means driven or guided thereby changing. For example, a slip between the traction sheave and driven suspension means can increase over time due to wear, in particular if the suspension means modulus of elasticity changes. A lateral guidance of the support means provided by the traction sheave and/or the deflection rollers can also decrease over time due to wear. In addition, as the diameter of the suspension means decreases, the conveying radius is reduced and more revolutions of the traction sheave are required over the service life for the same travel distance between two specific floors.

Various other types of signs of wear can also occur, which can cause other types of changes in the physical properties of the suspension means arrangement.

Various approaches have been developed to limit or monitor the wear of components within an elevator system, in particular the wear of components of the suspension means arrangement. Some such approaches are described in EP 3 130 555 A1, CN 104627762 A, WO 2018/139434 A1, CN 109987480 A, JP 2011-132010 A, EP 2 299 251 A1, EP 0 849 208 A1, JP 2011-126710, WO 2019/081412 A1, WO 2003/035531 A1, WO 2007/141371 A2, JP 2019-085242 A, EP 2 628 698 B1 and WO 2016/040452 A1.

SUMMARY

There may be, inter alia, a need for a method by means of which wear on components of a suspension means arrangement can be monitored more efficiently, more reliably and/or more cost-effectively. Furthermore, there may be a need for a monitoring device designed to carry out or control such a method, a corresponding computer program product and a computer-readable medium storing the computer program product.

Such a need can be met by the subject matter according to any of the advantageous embodiments that are defined in the following description.

According to a first aspect of the invention, a method is proposed for determining a wear state of components of a suspension means arrangement of an elevator system, the method comprising at least the following method steps, preferably in the specified order:

- monitoring an actual time curve of a first parameter which correlates with the wear state of at least one first monitored component of the components;
- comparing the actual time curve of the monitored first parameter with a predetermined expected time curve of the first parameter;
- determining the wear state of the monitored component based on a result of the comparison.

According to a second aspect of the invention, a monitoring device is proposed for determining the wear state of components of a suspension means arrangement of an elevator system, which device is configured to carry out or control an embodiment of the method according to the first aspect of the invention.

According to a third aspect of the invention, a computer program product is proposed which contains computer-readable instructions which, when executed on a computer, in particular a computer-like programmable monitoring device according to the second aspect of the invention, instruct the computer to carry out or control the method according to an embodiment of the first aspect of the invention.

According to a fourth aspect of the invention, a computer-readable medium is proposed, on which a computer program product according to the third aspect of the invention is stored.

Possible features and advantages of embodiments of the invention can be considered, inter alia and without limiting the invention, to be based upon the concepts and findings described below.

In the case of conventional approaches, by means of which the wear of components of a suspension means arrangement is to be monitored, a parameter is typically monitored that allows conclusions to be drawn about the wear. For example, the dimensions of the suspension means, i.e., for example, the diameter of a cable, are monitored. As further examples, surface structures on the traction sheave or the deflection rollers, magnetic fluxes through suspension means, an elongation behavior of suspension means or a slip between suspension means and, for example, the traction sheave, can also be monitored. In this case, a current wear state of the relevant component is generally inferred from a current measured value of the parameter. For example, the current measured value is compared with a predetermined limit value and, if the limit value is exceeded or not reached, it is inferred that the monitored component has reached a critical wear state.

In the approach presented here, however, a single measurement of a parameter at a single point in time should not be used to determine the wear state of a component of the suspension means arrangement. Instead, a time curve of a parameter is to be monitored. In other words, the change of the monitored parameter over time is to be tracked. For this purpose, it is generally necessary to measure the monitored parameter continuously or at time intervals, for example periodically, and to track the measured values obtained thereby, i.e. to store them, for example.

The time curve of the parameter determined in this way is then not to be compared with a single limit value or the like, as is the case in conventional approaches. Instead, the determined time curve is to be compared with a predetermined expected time curve of this parameter.

Such an expected time curve of the parameter can have been determined beforehand, for example based on experiments, data collected from other elevator systems and the suspension means arrangements thereof, simulations or the like. Alternatively or additionally, an expected time curve of the parameter can also have been determined based on a curve of the parameter that was previously observed on the same component, i.e. by extrapolation of a previously determined curve of the parameter, for example.

By comparing the actual time curve of the monitored parameter with the predetermined expected time curve of the parameter, information can be determined about the current wear state and/or possibly also about a future wear state of the observed component of the suspension means arrangement.

This approach is based on the observation that, in some cases, a wear state of a component of the suspension means arrangement is not necessarily reflected in the current physical properties of this component, and therefore cannot be determined by measuring a parameter which correlates therewith, or that, in some cases, information about a future wear state cannot be derived solely from parameters measured at a single point in time. Instead, it was observed that monitoring a behavior over time, with which physical properties of these components change, can allow a more reliable and/or more precise conclusion to be drawn about current and, in particular, future wear states of the components.

The parameter to be monitored within the scope of the approach described here with regard to its actual time curve should correlate with the wear state of at least a first monitored component of the plurality of components in the suspension means arrangement. Such a correlation can be expressed in that the parameter changes the value thereof depending on the current wear state of the monitored component, preferably in a clearly determined manner.

Since, as explained in more detail below, it can be advantageous in some embodiments to monitor an additional parameter, the parameter to be monitored in all embodiments is referred to herein as the first parameter and the additional parameter to be additionally monitored in some embodiments is referred to as the second parameter.

According to an embodiment, the first parameter to be monitored is selected from the group of parameters comprising:

- a length of the suspension means,
- elongation properties (reversible and/or irreversible) of the suspension means,
- radial dimensions of the suspension means,
- optical properties of the suspension means,
- magnetic properties of the suspension means,
- electrical properties of the suspension means,
- a mechanical stress on the suspension means,
- dimensions of a structure of the contact surface of the traction sheave,
- a slip occurring between the suspension means and the contact surface of the traction sheave, and
- a force exerted by the suspension means on the anchoring, in particular also
- a time curve of vibrations or micro-accelerations which can be assigned to the suspension means due to the structure thereof, e.g. a shift in the cable lay length, and in particular
- change in the natural frequency of the elevator system (cabin and/or counterweight) in the longitudinal direction of the shaft at a given position (by the acceleration sensor, the car mass remains the same, therefore conclusion regarding the belt), and in particular
- evaluation of the readjustments to the elevator car, and in particular
- ambient temperature (main driver of plastics material aging), and in particular
- humidity (main driver of plastics material aging).

Each of the stated parameters correlates to a certain extent with the current wear state of a component of the suspension means arrangement. In the best case, a parameter or the time curve thereof also correlates with a future wear state of the component. The individual parameters can be measured in different ways and can correlate with wear states of the same component or different components of the suspension means arrangement in different ways. The stated parameters can be measured relatively easily and/or precisely, preferably using measuring apparatuses which are structurally simple and therefore more cost-effective and/or are provided in an elevator system in any case.

The length of the suspension means, i.e. a distance between the ends of the suspension means that are anchored, for example, in the elevator shaft or on one of the components to be moved by means of the suspension means, often depends heavily on the wear state of the suspension means. Typically, the length of the suspension means increases with increasing wear. The length of the suspension means can be measured in different ways, directly or indirectly. For example, a distance between the counterweight held by the suspension means and a buffer provided at the bottom of the elevator shaft can be measured when the elevator car is on the top floor. The longer the suspension means, the smaller this distance becomes. This distance can be measured relatively easily and thus allows an accurate conclusion to be drawn about the current length of the suspension means.

The elongation properties of the suspension means, i.e. a way in which the suspension means can be lengthened in response to forces exerted thereon, also depend heavily on a wear state of the suspension means. The elongation properties of the suspension means can be represented by the modulus of elasticity thereof. They can refer to an elongation elasticity and/or flexural elasticity. The elongation properties can be measured directly, for example by measuring changes in length of the suspension means under known mechanical loads. The elongation properties of suspension means can also be determined directly, for example, using strain gauges or the like attached to the suspension means. Alternatively or additionally, the elongation properties can be measured indirectly, for example by monitoring how much and/or how often so-called level compensation has to be carried out. In the case of such level compensation, the elevator car is stopped at a target position and then changes the level thereof, i.e. the height thereof in the elevator shaft, when the car is loaded or unloaded, due to the associated changes in length of the suspension means. The level change is then compensated by suitable movement of the suspension means by means of the drive machine. The extent and/or frequency with which such a level compensation has to be carried out can allow a conclusion to be drawn about the current elongation properties of the suspension means.

Furthermore, the elongation and correspondingly also the modulus of elasticity correlate with the natural frequency of the system. Thus, by measuring the natural frequency, it is possible to infer the modulus of elasticity, and vice versa, by determining the modulus of elasticity, it is possible to infer the natural frequency.

The radial dimensions of suspension means, i.e. the diameter of a cable or a thickness of a belt, for example, can decrease over time due to wear, in particular due to abrasion, and are thus an effective measure for determining a current wear state of suspension means. The radial dimensions of a suspension means can be measured directly or indirectly. For example, the radial dimensions can be determined using optical sensors. A decrease in the radial dimensions of a suspension means beyond a certain level can be an indication for a replacement wear state of the suspension means, i.e. that the suspension means should be replaced.

Optical properties of the suspension means can also change over time due to wear. For example, increasing wear can change a color, a reflectivity and/or optically recognizable structures such as surface roughness or macroscopic structures on the surface of the suspension means, for example in the form of protruding wires of a cable. The measurement of optical properties of the suspension means can thus allow a relatively simple conclusion to be drawn about the wear state thereof. The optical properties of a suspension means can be monitored using suitable sensors such as light sensors, photodiodes, cameras, etc.

The magnetic properties of the suspension means often also correlate strongly with the wear state thereof. Particularly in the case of ferromagnetic suspension means, increasing wear can have a significant impact on the magnetic flux occurring in the suspension means. By means of a measurement of the magnetic flux through the suspension means, which is relatively simple to carry out, conclusions can be drawn about the wear state of the suspension means.

In many cases, the electrical properties of the suspension means are also influenced by the wear state thereof. Particularly in the case of suspension means which have good electrical conductivity, such as steel cables or belts having load-bearing steel strands, increasing wear can have a significant impact on an electrical resistance caused by the suspension means. For example, breaks or cracks in one of the many strands in a suspension means that occur with increasing wear can result in the electrical resistance experienced by an electric current conducted through the suspension means increasing over time. By means of a measurement of the electrical resistance of the suspension means, which is relatively simple to carry out, conclusions can therefore be drawn about the wear state of the suspension means.

The mechanical stress acting in the suspension means during operation of the elevator system can also depend on the wear state of the suspension means. In particular for the typical case in which the elevator car and the counterweight are held and moved using a plurality of suspension means, wear can have the effect that the length of some of the suspension means changes more significantly than that of others. Accordingly, the forces to be withstood by the individual suspension means and thus the mechanical stresses acting in the suspension means change over time. Such mechanical stresses can be measured relatively easily and thus allow a conclusion to be drawn about signs of wear.

While the parameters discussed above relate primarily to determining a wear state of the suspension means, other parameters can be monitored in order to be able to identify wear on other components of the suspension means arrangement.

For example, dimensions on a structure of the contact surface of the traction sheave can change with increasing wear. The traction sheave can have structures such as grooves, channels, projections, axial lateral boundaries, etc. on the contact surface thereof, i.e. typically on the lateral surface thereof, on which the suspension means come into contact with the traction sheave. These structures can be designed to move the suspension means by means of the traction sheave with a desired traction or a desired slip and/or to guide them laterally. Over time, these structures can wear out due to wear, i.e. the dimensions thereof can change. For example, grooves on the lateral surface of the traction sheave can wear out over time, and in particular can become rounded or change in depth. Monitoring the dimensions of such structures can thus allow a conclusion to be drawn about the wear state of the traction sheave. Since the traction sheave also interacts with the suspension means, a wear state of the suspension means can optionally also be inferred indirectly.

The slip occurring between the suspension means and the contact surface of the traction sheave can also change over time due to wear. This can occur as a result of the aforementioned changes in the dimensions of the structures on the contact surface of the traction sheave. However, there can also be other wear-related reasons such as, for example, an increasing occurrence of contamination on the traction sheave and/or the suspension means, for example due to over-lubrication and/or the use of an incorrect lubricant. The slip can easily be measured directly or indirectly. For example, a car travel distance travelled by the elevator car during a travel process can be compared with a traction sheave travel distance or a pulley travel distance, i.e. with the distance by which the lateral surface of the traction sheave or the deflection roller moves during the travel process.

Wear on the suspension means arrangement can also lead to changes in the forces exerted by the suspension means on the anchoring thereof. The possible wear-related changes to the mechanical stresses in suspension means that have already been mentioned above can also affect the anchoring of the suspension means. If the suspension means tension deviates excessively from a target value, it may be necessary to re-tension the suspension means. Uneven suspension means tensions can otherwise lead, for example, to unequal or non-homogeneous signs of wear within the elevator system, for example on guide shoes of the elevator car and/or the counterweight. Furthermore, uneven suspension means tensions can also lead to suspension means jumping on the traction sheave and/or deflection rollers and/or to an inclined position of deflection rollers on the elevator car or the counterweight. Ultimately, increased signs of wear on the components of the suspension means arrangement can be both caused and detected as a result.

The forces exerted by the suspension means on the anchorings thereof can be determined, for example, by means of so-called intelligent fixed points. In this case, fixing the suspension means, for example, on an elevator shaft cover is not only used to hold the suspension means mechanically. Instead, the fixing is also equipped with suitable technical means in order to be able to determine the forces exerted by the suspension means on the fixing. The determined forces or stresses in the fixing or the anchoring can be determined with relatively little effort with sufficient precision to be able to draw conclusions about wear states within the suspension means arrangement, in particular conclusions about wear states on different components of the suspension means arrangement.

According to an embodiment of the invention, the proposed method also comprises the following steps:

- monitoring an actual time curve of a second parameter which influences the wear state of at least one monitored component of the components and/or correlates with the wear state of at least one monitored component of the components, the second parameter differing from the first parameter;
- determining the wear state of the first monitored component based both on the result of comparing the actual time curve of the monitored first parameter with a predetermined expected time curve of the first parameter and on the result of monitoring the actual time curve of the monitored second parameter.

In other words, in addition to monitoring the actual time curve of the first parameter, a further, second parameter can be monitored with regard to the actual time curve thereof. This second parameter can, for example, represent a physical property of one of the components of the suspension means arrangement, which, similar to the case of the first parameter, correlates with the wear state of the relevant monitored component. Alternatively or additionally, the second parameter can influence the wear state of the monitored component, i.e. the second parameter can represent a physical property which influences how the wear in the relevant component changes over time. The second parameter can thus represent a physical property which is not necessarily a property of the relevant component itself, but rather a property of ambient conditions or boundary conditions in which the component is operated and which also influence wear of the component.

The component of which the wear state is influenced by the second parameter or correlates therewith can be the same component as the first component, of which the wear state correlates with the first parameter monitored according to the method. However, the components can also differ.

The wear state of the first monitored component can then be determined based on the two monitored parameters, i.e. the actual time curve of the first parameter and the actual time curve of the second parameter. In other words, information about the current and/or future wear state of the first component can be derived on the basis of the actual time curve of the first parameter and a comparison of this profile with the associated predetermined expected time curve of the first parameter, and on the basis of the actual time curve of the second parameter.

By taking into account the actual time curves of two different parameters, various advantageous effects can be achieved, which can have a positive effect on reliability, precision and/or other properties of the information determined about the wear state of the component.

For example, according to any embodiment, the first parameter and the second parameter can correlate with the wear state of the first monitored components in different ways.

In other words, the wear state of the first monitored component can affect or be influenced by the first and second parameters in different ways. Although the two parameters then correlate with or influence the wear state of the monitored component, a type of qualitative and/or quantitative correlation can differ between the two parameters. A certain redundancy for determining the wear state can therefore be achieved by measuring the two parameters. The different types of correlation with the wear state can also lead to a more precise statement being made about the wear state overall.

According to a further embodiment of the method, the first parameter and the second parameter can correlate with the wear state of the first monitored component of the components in a mutually interactive manner.

In other words, the two parameters to be monitored in the method with regard to the actual time curve thereof can advantageously be selected in such a way that the properties they represent interact, i.e. influence one another. In particular, the parameters can be selected in such a way that variations in the second parameter influence the wear occurring in the component monitored therewith in a manner which can be detected using the first parameter.

For example, an ambient temperature in an elevator shaft accommodating the suspension means can be measured as a second parameter. This ambient temperature generally influences the wear which occurs on the suspension means. The wear state of the suspension means can then be determined, for example, based on a first parameter which correlates with the wear state of the suspension means, i.e. a length of the suspension means that is to be measured or a modulus of elasticity of the suspension means, for example, and the ambient temperature can also be taken into account.

In a further embodiment, the ambient temperature and the slip behavior of a belt, for example, are correlated.

According to an embodiment, based on measurement results of the monitored second parameter, the predetermined expected time curve of the first parameter can be selected from a plurality of possible predetermined expected time curves of the first parameter.

In other words, it can be known in advance that the physical properties represented by the second parameter generally influence the time curve of wear occurring in a component of the suspension means arrangement in a predetermined manner. This can have been determined in advance, for example, by means of experiments, observations of existing elevator systems, calculations or simulations. The expected time curve of the first parameter, which correlates with this wear, can differ accordingly, depending on how the physical property reproduced by the second parameter actually occurs.

By measuring the second parameter and monitoring the actual time curve thereof, a more precise statement or a more precise assumption can thus be made with regard to the expected time curve of the first parameter. By being able to compare the monitored actual time curve of the first parameter with an expected time curve of the first parameter that is predetermined more precisely in this way, more reliable and/or more precise information about the wear state of the monitored component can be derived overall.

In the embodiments described above, the second parameter to be monitored can be specifically selected from the group of parameters comprising:

- a temperature in the region of the suspension means arrangement,
- a humidity in the region of the suspension means arrangement, and
- an air pressure in the region of the suspension means arrangement.

In other words, as a variant of this embodiment, the second parameter to be monitored can be the temperature in the region of the suspension means arrangement, i.e. an air temperature prevailing in the elevator shaft or a temperature measured directly on one of the components of the suspension means arrangement, for example. This temperature generally influences the wear which occurs on the suspension means arrangement over time. Wear often increases with increasing temperature. In this case, it can be advantageous for the proposed method that the temperature is not measured at a single point in time and an attempt is then made to draw a conclusion therefrom about the wear, but rather a time curve of the temperature is monitored. Information about this temperature time curve or an average temperature over a time period that is calculated therefrom allows a more precise statement to be made about a typically assumed wear within this time period and thus about an expected time curve of the first parameter.

By comparing the determined actual time curve of the first parameter with the temperature-dependent expected time curve of the first parameter, statements about the current wear state of the monitored component can then be determined with a relatively high level of accuracy. For example, the state of the casing of plastics-coated suspension means that are subject to signs of aging can in particular be determined in this way.

Even statements about a future wear state of this component can possibly be determined. For example, if the actual time curve matches the expected time curve within an acceptable tolerance, a time extrapolation can be used to infer a future point in time at which the wear will exceed an acceptable level. This information can be used, for example, in order to be able to plan maintenance work on the elevator system in advance. As a result, the amount of work and/or costs can be reduced.

Alternatively or additionally, the second parameter to be monitored can be the humidity in the region of the suspension means arrangement. A prevailing humidity also typically has an influence on wear occurring in a suspension means arrangement. For example, increased humidity can lead to greater wear, for example due to signs of corrosion. In this case, too, based on the actual time curve of the humidity or a mean value derived therefrom, a conclusion can be drawn as to how wear will occur in the observed time period and what time curve of the first parameter is to be expected accordingly. The actual time curve of the first parameter can then be compared again with the expected time curve of the first parameter, which was predetermined on the basis of the second parameter.

As a further possibility, the second parameter to be monitored can be the air pressure in the region of the suspension means arrangement. The air pressure prevailing during an observation time period can also have an influence on the wear which occurs in the suspension means arrangement, such that the information about the actual time curve of the air pressure can in turn be used to realistically predetermine the expected time curve of the first parameter.

Alternatively or additionally, in the previously described embodiments, the second parameter to be monitored can specifically indicate a frequency of journeys of an elevator car moved by the suspension means arrangement.

The frequency with which the elevator car is moved within an observation period by means of the suspension means arrangement naturally also has an influence on the signs of wear which occur on the suspension means arrangement. By observing, as a second parameter, how often the elevator car has been moved in relation to a unit of time or within a time period since the start of observation, information can be obtained which in turn can be used to predetermine an expected time curve of the first parameter, such that the actually observed time curve of the first parameter can be compared again with this expected time curve, in order to be able to draw conclusions about the wear state of the monitored component.

It may also be possible to take into account how far, i.e. over what travel distance, the observed journeys were in each case, what payload was transported on the observed journeys in each case, and/or other variables which can have an influence on the wear that occurs with the journeys. Furthermore, in addition to monitoring the frequency of travel, other parameters can also be monitored as second parameters, such as the already described temperature, humidity and/or air pressure in the region of the suspension means arrangement.

According to an embodiment, the wear state can be determined based on a deviation of the actual time curve of the monitored first parameter from a predetermined expected linear time curve of the first parameter.

In other words, the monitored actual time curve and the predetermined expected time curve of the first parameter can be compared with one another constantly or at certain time intervals. In this case, a linear curve can be assumed for the predetermined time curve, i.e. it can be assumed that the properties of the monitored component of the suspension means arrangement that is represented by the first parameter change in a linear manner over time. A way in which the actual time curve of the monitored first parameter differs from the predetermined expected linear time curve of this first parameter can allow a conclusion to be drawn about prevailing or future wear states.

In many cases or over longer time periods, for example, the monitored actual time curve of the first parameter will likewise change linearly over time. A proportionality factor which represents the time dependency of the changes can in this case be the same or different for the actual time curve and the expected time curve. Depending on how the two proportionality factors differ from one another, a current wear state of the monitored component can be inferred.

In an alternative scenario, the monitored actual time curve of the first parameter can initially change linearly, but then the development thereof over time can change and no longer change linearly as a function of time but, for example, change underproportionally or overproportionally. The deviation to be observed between the actual time curve of the first parameter and the predetermined expected linear time curve of the first parameter can allow a conclusion to be drawn about current and/or future wear states.

According to an embodiment, the wear state can be determined based on a reversal of a property of the actual time curve of the monitored first parameter compared to a previous time curve of the first parameter.

In other words, it can be observed that the monitored first parameter develops in a certain direction over a certain time period, i.e. follows a trend. From a certain point in time, the direction in which the property represented by the first parameter changes may reverse, i.e. trend reversal occurs. If such a trend reversal is detected by comparing the actual time curve of the first parameter with the expected time curve of the first parameter, this can contain information about the current and/or future wear state of the monitored component. In this case, the expected time curve of the first parameter can correspond to a previous time curve of the first parameter. In other words, the trend reversal can be detected if the actual time curve of the first parameter differs significantly over time from a time extrapolation of a previous actual time curve of the first parameter.

According to an embodiment, the wear state can be determined based on a sign change of a second time derivative of the actual time curve of the monitored first parameter compared to a second time derivative of the previous actual time curve of the first parameter.

In other words, it can be observed how the actual time curve of the monitored first parameter changes over time. The changes occurring over time can be represented by a first time derivative of the actual time curve of the first parameter. In this case, the changes can follow a trend, i.e. become successively smaller, for example, such that the physical property represented by the first parameter appears to approach a saturation value. If such a trend changes, this can mean that the changes in the first parameter, which originally became increasingly smaller over time, suddenly become larger again. This can typically be associated with a sign change in the second time derivative of the actual time curve of the monitored first parameter. Such a sudden change in the previous trend and the associated change in sign can be an indication of the presence of a specific wear state in the relevant component.

According to an embodiment, on the basis of a specific example, the wear state can be determined based on an incipient increase in a modulus of elasticity of a cable-like suspension means of the suspension means arrangement after a preceding successive decrease in the modulus of elasticity of the cable-like suspension means.

In this specific example, the suspension means can be a cable having a large number of internal and external strands. Typically, the inner strands account for a large part of the load-carrying capacity of the cable and, when in use, absorb a predominant proportion of the mechanical stresses within the cable. The outer strands surround and protect the inner strands. Although the outer strands normally contribute to a flexural rigidity of the cable, they only assume a small part of the load-carrying capacity and thus the mechanical stresses in the cable. In the case of solid steel cables (in the typical elevator load range between 2 and 8.33% of the minimum cable breaking load), the cable core (inner strands) has a higher mechanical longitudinal stress than the outer strands. The tension level of the outer strands is significantly lower than that of the cable core due to the stranded structure.

Over time, in particular in the inner strands, a gradual increase in the elasticity of the cable, i.e. a decrease in the modulus of elasticity of the cable, may occur due to signs of fatigue. The cable becomes softer and softer in an increasingly apparent manner, such that readjustments when approaching floors and level adjustments when loading and unloading the elevator car increase over time.

From a certain point in time, the inner strands can crack or break due to the more frequent and greater elongation of the cable. As a result, the load-carrying capacity of the cable is no longer primarily assumed by the inner strands, as was previously the case, but increasingly by the outer strands as well. This can lead to a trend reversal in the active modulus of elasticity of the entire cable, i.e. after the modulus of elasticity of the cable has first gradually decreased, it can suddenly increase again. This trend reversal can be seen in a sign change of the second time derivative of the actual time curve of a modulus of elasticity to be measured or a measured variable correlating therewith. The trend reversal can be an indication that a certain wear state has occurred in the cable or will occur in the future. For example, due to the trend reversal, it can be inferred that strands inside the cable can no longer cope with the mechanical stresses which are normally to be absorbed there, and the cable should therefore be discarded, i.e. replaced, in the near future.

According to an embodiment, the predetermined expected time curve of the first parameter can be predetermined based on a large number of measured values which were determined in different elevator systems.

In other words, the actual time curve of the first parameter can be compared with an expected time curve of this parameter that was previously determined by recording measured values which correspond to this first parameter or at least correlate therewith in a large number of elevator systems. The actual time curve of the first parameter detected on a specific suspension means arrangement of an elevator system can thus be compared, for example, with previously recorded actual time curves, as observed in other elevator systems. Based on such a comparison, in particular based on deviations between the actual time curve observed in the specific elevator system and the actual time curves of the first parameter previously observed in other elevator systems, it is then possible to infer the current or future wear states of the monitored components in the suspension means arrangement of the specific elevator system.

According to the second aspect of the invention, a monitoring device is described that is configured to implement embodiments of the method described above.

For this purpose, the monitoring device can have one or a plurality of sensors, by means of which the first and/or the second and/or further parameters can be measured. For example, the monitoring device can have sensors for measuring the length of the suspension means, sensors for measuring the elongation properties of the suspension means, sensors for measuring radial dimensions of the suspension means, sensors for measuring optical properties of the suspension means, sensors for measuring magnetic properties of the suspension means, sensors for measuring electrical properties of the suspension means, sensors for measuring mechanical stresses within the suspension means, sensors for measuring dimensions of a structure of the contact surface of the traction sheave, sensors for measuring a slip occurring between the suspension means and the contact surface of the traction sheave and/or sensors for measuring forces exerted by the suspension means on an anchoring. Such sensors can include, for example, optical sensors such as photodiodes or cameras, electrical sensors, mechanical sensors, magnetic sensors, etc.

Depending on a currently measured parameter, the sensors can generate and forward a measurement signal, in particular an electrical measurement signal. The monitoring device can have an evaluation device in which the measurement signals are received and evaluated. The evaluation device can have a processor by means of which measurement signals or measurement data can be processed. In particular, the monitoring device can have a data memory in which measurement signals can be stored temporarily. Specifically, the monitoring device can be configured to record measurement signals and to ultimately monitor the actual time curve of a parameter by means of the intermediate storage of the signals.

The monitoring device can be connected to a controller of the elevator system in order to be able to exchange data therewith. In particular, information about the wear state determined in the monitoring device can be forwarded to the controller of the elevator system. Alternatively or additionally, the monitoring device of the elevator system can be connected to a control center, for example, in order to be able to transmit the information about the determined wear state to the control center. Furthermore, the monitoring device of the elevator system can optionally be connected to monitoring devices of other elevator systems and can exchange data with the devices.

The computer program product proposed according to the third aspect of the invention contains software in the form of computer-readable instructions which instruct a computer, which can be part of the monitoring device described above, for example, to carry out or control embodiments of the method proposed herein. The computer program product can in this case be formulated in any computer language.

According to the fourth aspect of the invention, the computer program product can be stored on a non-transitory computer-readable medium. The computer-readable medium can be technically implemented in different ways. For example, the computer-readable medium can be flash memory, a CD, a DVD, or other portable, volatile or non-volatile memory. Alternatively, the computer-readable medium can be part of a network of computers or servers, in particular part of the Internet or part of a data cloud (cloud), from which the computer program product can be downloaded.

It should be noted that some of the possible features and advantages of the invention are described herein with reference to different embodiments of the method described herein and of the monitoring device implemented carrying out the method. A person skilled in the art recognizes that the features can be combined, transferred, adapted or replaced as appropriate in order to arrive at further embodiments of the invention.

Embodiments of the invention will be described below with reference to the accompanying drawings, with neither the drawings nor the description being intended to be interpreted as limiting the invention.

DESCRIPTION OF THE DRAWINGS

FIG. 1 shows a monitoring device for determining a wear state of components of a suspension means arrangement in an elevator system according to an embodiment of the present invention.

DETAILED DESCRIPTION

FIG. 1 shows an elevator system 1 in which a wear state of components of a suspension means arrangement 5 can be determined by means of a monitoring device 3.

The elevator system 1 has a car 7 and a counterweight 9, which can be moved vertically between different floors 13 within an elevator shaft 11. The car 7 and the counterweight 9 can be held and moved by means of the suspension means arrangement 5. For this purpose, the suspension means arrangement 5 has a plurality of cable-like suspension means 15 such as cables, straps or belts. The suspension means 15 can be driven with a traction sheave 17 of a drive machine 19. For this purpose, the traction sheave 17 can have a structure which is adapted to a geometry of the suspension means 15, for example in the form of grooves, channels or the like, on a contact surface 21 on which the suspension means 15 rest on the traction sheave 17. In the example shown, the suspension means 15 are fixed to a ceiling 25 of the elevator shaft 11 via anchorings 23. From there, the suspension means 15 extend down to the deflection rollers 27, 29, which are attached to the car 7 or the counterweight 9, in order to then extend back up to the traction sheave 17 of the drive machine 19. An operation of the drive machine 19 is controlled by an elevator controller 31. The elevator controller 31 can communicate with the monitoring device 3.

A large number of sensors or sensor systems are provided in the elevator system 1, by means of which parameters can be monitored, which allow a conclusion to be drawn about states or properties within the elevator system 1 that correlate with or influence states of wear of components of the suspension means arrangement 5. These sensors or sensor systems can be wired to the monitoring device 3 or designed to be able to communicate wirelessly with the monitoring device 3, in order to be able to transmit measurement data or measurement signals which represent parameters measured by the sensors or sensor systems to the monitoring device 3.

For example, a length measurement sensor system 35 is provided at a lower end of the elevator shaft 11 in the vicinity of a buffer 33 adjacent to a travel path of the counterweight 9. A distance between the counterweight 9 and the buffer 33 can be determined by means of this length measurement sensor system 35 when the counterweight 9 is located in the lowest possible position thereof, i.e. when the car 7 is located on the highest possible floor 13. A current length of the suspension means 15, which can change over time, in particular due to material elongation, can be indirectly inferred from the measurement of this distance.

Radial dimensions of the suspension means 15, i.e. a diameter of suspension cables or a thickness of suspension belts, for example, can be measured using a sensor system specially adapted for this purpose. For example, a camera 37 can be used for this purpose, the field of view of which is directed towards the suspension means 15. Optionally, this camera 37 can alternatively or additionally also be used to detect optical properties of the suspension means, such as a change in surface textures on the suspension means and/or a change in color, reflectivity, etc.

Furthermore, a sensor system 39 can be provided for measuring magnetic properties of the suspension means 15. By means of this sensor system 39, a magnetic flux through one of the suspension means 15 can be measured, for example.

Additionally or alternatively, a sensor system 41 can be provided for measuring electrical properties of the suspension means 15. This sensor system 41 can, for example, measure electrical current flows or an electrical resistance through one of the suspension means 15.

The anchorings 23 can be designed as intelligent fixed points and configured to measure mechanical stresses on or in the suspension means 15. For example, strain gauges can be provided in the anchorings 23, which interact with the suspension means 15 or the anchored ends thereof. The anchorings 23 can optionally also be designed to measure forces exerted by the suspension means on the anchorings 23.

Furthermore, a sensor system 43 can be provided, by means of which dimensions of a structure of the contact surface 21 of the traction sheave 17 can be monitored. Such a sensor system 43 can, for example, in turn be implemented using a camera or other optical sensors, but sensors which function in a different manner can also be used.

In addition, the monitoring device 3 can receive data and information, on the basis of which other parameters which correlate with the wear of components of the suspension means arrangement 5 can be inferred, from the elevator controller 31 and/or other sensors 45, which can be used, for example, to determine a current position of the elevator car 7 in the elevator shaft 11.

For example, it is possible to infer elongation properties of the suspension means 15 from a way in which level adjustments are carried out by the elevator controller 31 when the elevator car 7 stops at a floor 13, i.e. how often and/or over what distance, for example.

By comparing a controlled movement distance, which was controlled by the drive machine 19 by means of the elevator controller 31, with an actual movement distance of the car 7 or the counterweight 9, as can be detected, for example, using the signals from the sensors 45, it is also possible to infer a slip occurring between the suspension means 15 and the contact surface 21 of the traction sheave 17.

Furthermore, a temperature sensor 47, a humidity sensor 49 and/or an air pressure sensor 51 can be provided in the elevator shaft in order to be able to measure corresponding prevailing conditions in the region of the suspension means 15.

The monitoring device 3 is configured to carry out a method using measurement data, as can be provided by at least one of the sensors or sensor systems described above, by means of which method information can be determined about a current and/or a future wear state of components of the suspension means arrangement 5.

For this purpose, the monitoring device 3 typically has a data processing device such as a data processor and a data memory in which measurement data can be stored and retrieved again at a later point in time, and data interfaces via which the monitoring device 3 can exchange data with the various sensors and sensor systems, for example.

Within the scope of the method, an actual curve of a first parameter is monitored continuously or at predetermined time intervals, for example by collecting and tracking measurement data from one or more of the sensors and sensor systems. The first parameter is selected in such a way that it correlates with the wear state of at least one of the components of the suspension means arrangement 5. The actual time curve of the first parameter monitored in this way is then compared with a predetermined expected time curve of this parameter, and the wear state of the monitored component is then determined based on a result of this comparison.

For example, the current length of the suspension means 15 can be determined as the first parameter based on the data provided by the length measuring sensor system 35. By accumulating the data over a certain time period, information can be derived about the actual time curve of this parameter, i.e. how the length of the suspension means 15 changes over time.

An expected time curve, which indicates how the length of the suspension means typically changes over time, can be predetermined from previously conducted experiments, simulations and/or knowledge obtained from other elevator systems. By comparing the actual time curve of the length behavior of the suspension means 15 with the expected time curve, a statement can then be determined about the current and/or a future wear state of the suspension means 15.

For example, it can be detected that the observed suspension means 15 lengthen faster over time than is known from the suspension means used as a reference and would thus be expected. This information can be used in order to be able to infer a progressing wear state and/or, for example, a point in time at which the suspension means 15 will have reached a permissible wear limit.

A second parameter is preferably also monitored in addition to the monitoring of the first parameter. Like the first parameter, this second parameter can correlate with the wear state of the monitored component. However, it may be preferable for the second parameter to even influence the wear state, i.e. a statement can be derived therefrom as to how the wear state changes over time.

Many different combinations of first and second parameters to be monitored are conceivable or advantageous. It may be advantageous, for example, to select the two parameters to be monitored to be dependent on one another. In particular, it may be advantageous to select the way in which the first parameter is monitored or evaluated to be dependent on a selection of the second parameter and/or dependent on actual time curves of the second parameter.

For example, a temperature prevailing in the elevator shaft 11 or prevailing directly on the suspension means 15 can be monitored as a second parameter, for example by means of the temperature sensor 47. The wear state of the suspension means 15 can then be determined in the aforementioned example based on the comparison of the actual curve of the length of the suspension means 15 and additionally on the actual curve of the measured temperature. The fact that a temperature prevailing over a longer time period has an influence on the wear occurring in the suspension means 15 and the wear can in turn be reflected in a change in the length of the suspension means 15 can be used in this case. An expected time curve of the changes in length in the suspension means 15 can in this case be predetermined based on the actual curve of the temperatures.

In this case, of a plurality of possible predetermined expected time curves of the changes in length, which were calculated, simulated, experimentally determined or observed in other systems for different temperatures prevailing during a monitoring period, the expected time curve of the changes in length that resulted for the actual time curve of the temperature conditions can be used for comparison with the actual curve of the changes in length.

In general, information about the current and/or future wear state of components of the suspension means arrangement 5 can in particular be determined based on detected deviations of the actual time curve of the monitored first parameter from a predetermined expected time curve of this parameter that can be assumed to be linear, for example. Reversals of properties of the actual time curve of the monitored parameter or sign changes of a second time derivative of the actual curve of the monitored parameter can provide a good indication or a good data basis for determining the wear state of the monitored component.

In a special variant of the proposed method, the expected time curve of the first parameter can be predetermined based on a large number of measured values which were measured in various other elevator systems 53. For this purpose, the monitoring device 3 can communicate with a server 55, for example, which can receive such measured values from the other elevator systems 53 and, if necessary, evaluate and/or temporarily store the values. The server 55 can, for example, be part of a data cloud (cloud) and/or can be arranged in a control center which monitors a large number of elevator systems 53.

Finally, it should be noted that terms such as "comprising," "having," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for determining a wear state of components of a suspension means arrangement of an elevator system, the method comprising steps of:
- providing a monitoring device adapted to perform the following steps;
- monitoring a first parameter that correlates with a wear state of a first monitored component of the components of the suspension means arrangement using a first sensor that generates a first parameter monitoring signal to the monitoring device over an observation time period;
- storing the first parameter monitoring signal in the monitoring device and generating an actual time curve from the stored first parameter monitoring signal;
- comparing the actual time curve of the first parameter monitoring signal with a predetermined expected time curve of the first parameter;
- determining the wear state of the first monitored component based on a result of the comparison, wherein the wear state is determined based on an increase in a modulus of elasticity of a cable-like suspension means of the suspension means arrangement after a preceding successive decrease in the modulus of elasticity of the suspension means; and
- transmitting information about the determined wear state of the first monitored component from the monitoring device to at least one of a controller of the elevator system and a control center and using the transmitted information to plan maintenance work on the elevator system in advance.

2. The method according to claim 1 wherein the suspension means arrangement includes:
- the suspension means;
- a traction sheave driven by a drive machine for moving the suspension means resting on a contact surface of the traction sheave;
- at least one anchoring fixing the suspension means on an elevator car to be moved by the suspension means arrangement and/or in an elevator shaft accommodating the suspension means arrangement; and
- wherein the first parameter being monitored is selected from a group of parameters including
  - a length of the suspension means,
  - elongation properties of the suspension means,
  - radial dimensions of the suspension means,
  - optical properties of the suspension means,
  - magnetic properties of the suspension means,
  - electrical properties of the suspension means,
  - a mechanical stress on the suspension means,
  - dimensions of a structure of the contact surface of the traction sheave,
  - a slip occurring between the suspension means and the contact surface of the traction sheave, and
  - a force exerted by the suspension means on the at least one anchoring.

3. The method according to claim 1 further comprising steps of:
- generating another actual time curve by monitoring a second parameter that influences the wear state of the first monitored component and/or correlates with the wear state of the first monitored component, wherein the second parameter differs from the first parameter; and
- determining the wear state of the first monitored component based both on the result of comparing the actual time curve with the predetermined expected time curve of the first parameter and on a result of the another actual time curve of the monitored second parameter.

4. The method according to claim 3 wherein the first parameter and the second parameter correlate with the wear state of the first monitored component in different ways.

5. The method according to claim 3 wherein the first parameter and the second parameter correlate with the wear state of the first monitored component in a mutually interactive manner.

6. The method according to claim 3 wherein, based on measurement results of the monitored second parameter, the predetermined expected time curve of the first parameter is selected from a plurality of possible predetermined expected time curves of the first parameter.

7. The method according to claim 3 wherein the second parameter being monitored is selected from a group of parameters including:
- a temperature in a region of the suspension means arrangement;
- a humidity in the region of the suspension means arrangement; and
- an air pressure in the region of the suspension means arrangement.

8. The method according to claim 3 wherein the second parameter being monitored indicates a frequency of journeys of an elevator car moved by the suspension means arrangement.

9. The method according to claim 1 wherein the wear state is determined based on a deviation of the actual time curve of the first parameter from the predetermined expected linear time curve of the first parameter.

10. The method according to claim 1 wherein the wear state is determined based on a reversal of a property of the actual time curve of the first parameter compared to a previous actual time curve of the first parameter.

11. The method according to claim 1 wherein the wear state is determined based on a sign change of a second time derivative of the actual time curve of the first parameter compared to a second time derivative of a previous actual time curve of the first parameter.

12. The method according to claim 1 wherein the predetermined expected time curve of the first parameter is predetermined on a basis of a plurality of measured values that were determined in different elevator systems.

13. A computer program product containing computer-readable instructions that, when stored on a non-transitory computer-readable medium and executed on a computer, instruct the computer to carry out or control the method for determining according to claim 1.

14. A non-transitory computer-readable medium having the computer program product according to claim 13 stored thereon.

* * * * *